United States Patent
Morris

(10) Patent No.: US 12,548,126 B1
(45) Date of Patent: Feb. 10, 2026

(54) REMOVING VERTICAL BLUR FROM MUON TOMOGRAPHY IMAGES

(71) Applicant: Triad National Security, LLC, Los Alamos, NM (US)

(72) Inventor: Christopher Morris, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 329 days.

(21) Appl. No.: 18/455,925

(22) Filed: Aug. 25, 2023

(51) Int. Cl.
*G06T 5/73* (2024.01)
*G06T 5/10* (2006.01)
*G06T 15/08* (2011.01)

(52) U.S. Cl.
CPC ............ *G06T 5/73* (2024.01); *G06T 5/10* (2013.01); *G06T 15/08* (2013.01); *G06T 2207/10072* (2013.01)

(58) Field of Classification Search
None
See application file for complete search history.

(56) References Cited

U.S. PATENT DOCUMENTS

| 5,003,263 A | * | 3/1991 | Kasama | G01R 33/565 324/309 |
| 2015/0245802 A1 | * | 9/2015 | Sossong | A61B 6/4092 600/407 |
| 2015/0287237 A1 | * | 10/2015 | Bai | G01V 5/22 382/131 |

FOREIGN PATENT DOCUMENTS

| JP | 2004024659 A | * | 1/2004 | |
| KR | 20040091563 A | * | 10/2004 | G06T 11/005 |

OTHER PUBLICATIONS

C. L. Morris et al., "A New Method for Imaging Nuclear Threats using Cosmic Ray Muons," AIP Advances 3, 082128 (2013).
Jennifer Chu, "Physicists Design $100 Handheld Muon Detector," MIT News, available at https://news.mit.edu/2017/handheld-muon-detector-1121 (Nov. 20, 2017).

* cited by examiner

*Primary Examiner* — David Ometz
(74) *Attorney, Agent, or Firm* — LeonardPatel PC; Michael A. Leonard, II; Sheetal S. Patel

(57) ABSTRACT

Methods for removing vertical blur from muon tomography image are disclosed. Vertical blur may be removed by obtaining a three dimensional (3D) image of a scene and performing a Fourier transform on the obtained 3D image to remove vertical blur from the 3D image.

20 Claims, 7 Drawing Sheets

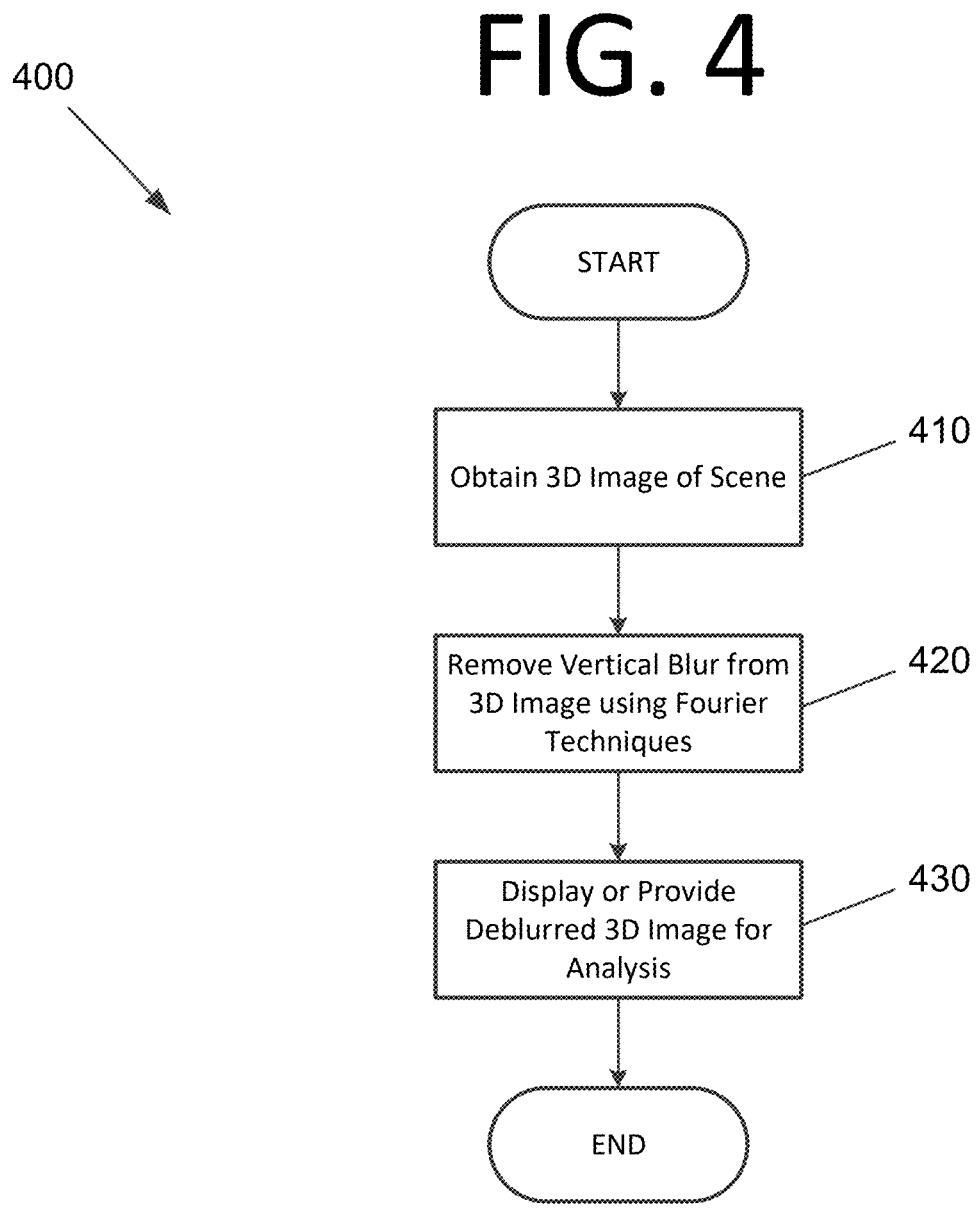

REMOVING VERTICAL BLUR FROM MUON TOMOGRAPHY IMAGES

STATEMENT OF FEDERAL RIGHTS

The United States government has rights in this invention pursuant to Contract No. 89233218CNA000001 between the United States Department of Energy and Triad National Security, LLC for the operation of Los Alamos National Laboratory.

FIELD

The present invention relates to muon tomography, and more specifically, to removing vertical blur from muon tomography images.

BACKGROUND

Muon tomography uses cosmic ray muons to image large volumes, such as to look for illicit objects in cargo. Cosmic ray muons arrive predominately from overhead. This leads to vertical blur in reconstructions produced by current algorithms. Accordingly, an improved and/or alternative algorithm to remove blur in a fast and effective manner may be beneficial.

SUMMARY

Certain embodiments of the present invention may provide solutions to the problems and needs in the art that have not yet been fully identified, appreciated, or solved by muon tomography technologies, and/or provide a useful alternative thereto. For example, some embodiments of the present invention pertain to removing vertical blur from muon tomography images.

In an embodiment, a method for removing vertical blur from a muon tomography image includes obtaining a three dimensional (3D) image of a scene, by a computing system. The 3D image includes a plurality of voxels. The method also includes removing vertical blur from the obtained 3D image to produce a deblurred image, by the computing system. The computer-implemented method further includes displaying the deblurred image or providing the deblurred image for further analysis, by the computing system. The removing of the vertical blur from the obtained 3D image includes performing a Fourier transform on the obtained 3D image.

In another embodiment, a computing system includes memory storing computer program instructions and at least one processor configured to execute the stored computer program instructions. The computer program instructions are configured to cause the at least one processor to obtain a 3D image of a scene, The 3D image includes a plurality of voxels. The computer program instructions are also configured to cause the at least one processor to remove vertical blur from the obtained 3D image to produce a deblurred image by performing a Fourier transform on the obtained 3D image. The computer program instructions are further configured to cause the at least one processor to display the deblurred image or provide the deblurred image for further analysis.

In yet another embodiment, a non-transitory computer-readable medium stores a computer program. The computer program is configured to cause at least one processor to obtain a 3D image of a scene. The 3D image includes a plurality of voxels. The computer program is also configured to cause the at least one processor to remove vertical blur from the obtained 3D image to produce a deblurred image by performing a Fourier transform on the obtained 3D image. The computer program is further configured to cause the at least one processor to display the deblurred image or provide the deblurred image for further analysis.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 4 is a flowchart illustrating a process for removing vertical blur from muon tomography images, according to an embodiment of the present invention.

Unless otherwise indicated, similar reference characters denote corresponding features consistently throughout the attached drawings.

DETAILED DESCRIPTION OF THE EMBODIMENTS

Figure 1:
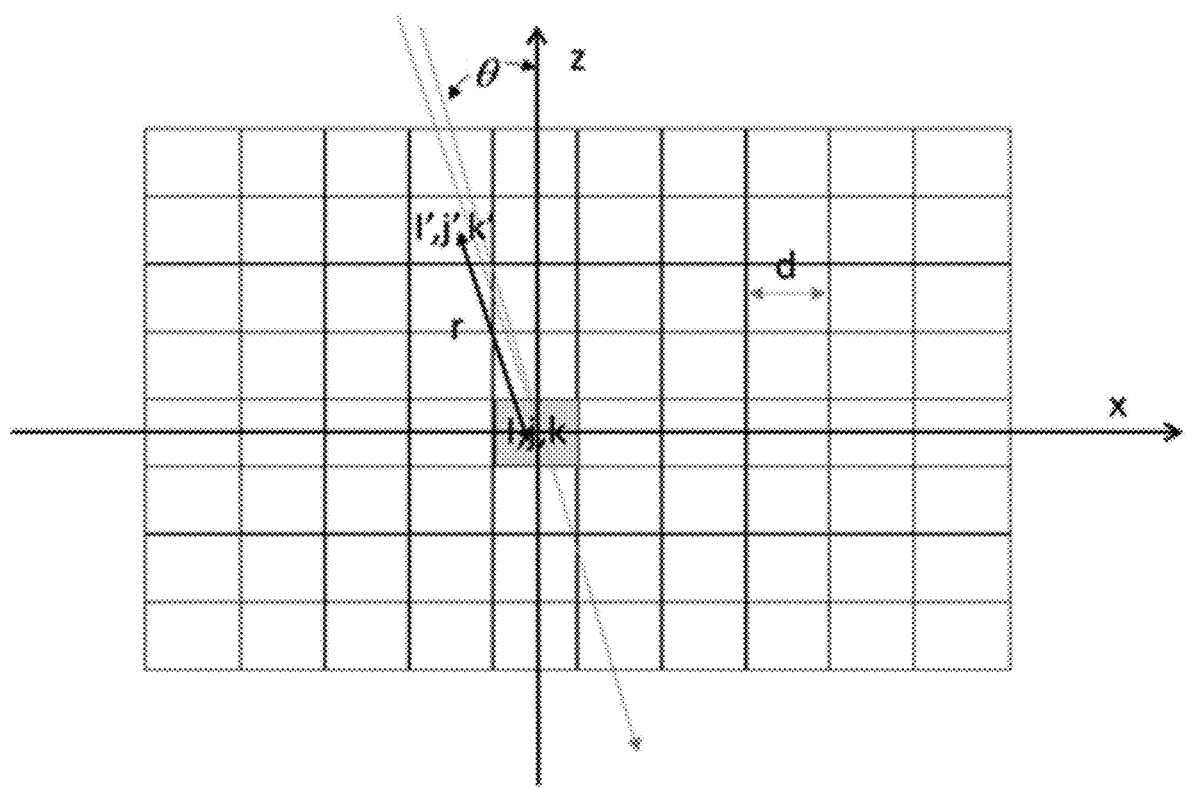
FIG. 1 is a graph illustrating a muon trajectory through a voxelated scene, according to an embodiment of the present invention.

Some embodiments generally pertain to removing a vertical blur from muon tomography images. Muon tomography uses measurements of the scattering of cosmic ray muons as the cosmic ray muons pass through matter to obtain (e.g., reconstruct) a 3D image of a scene between upper and lower tracking detectors. It should be noted that reconstruction is just an embodiment, and other methods may be utilized to obtain the 3D image. The scattering angular distribution $$\frac{dN}{d\theta}$$

is Gaussian in shape, given by:

$$\frac{dN}{d\theta} = \frac{N}{2\pi\theta_0^2} e^{-\frac{\theta^2}{2\theta_0^2}} \quad (1)$$

$\theta_0$ is the width given by:

$$\theta_0 = \frac{14.1 \text{ MeV}}{p}\sqrt{\frac{l}{X_0}} \quad (2)$$

where p is the muon momentum in units of MeV/c, and $l/X_0$ is the thickness of the material in radiation lengths ($X_0$) integrated along the muon trajectory. Higher order terms have been incorporated into the constant and the particles have been assumed to be traveling the speed of light.

Optimally, a three-dimensional (3D) image is generated by fitting a 3D array of radiation length weighted densities to a set of trajectories by maximizing the predicted log-likelihood of the measured trajectory information. The dimensionality of the problem makes this solution difficult to accomplish, so simplified methods are used for practical applications. One such method is the point of closest approach method (POCA). In this method, the scattering angle in information from each trajectory is used to increment the voxels at the point where the input and output trajectories most closely approach each other. There are many variations for weighting voxels at different distances along the trajectories and for using different weights (mean or median) for the scattering angles. A more sophisticated method called maximum likelihood expectation maximization (MLEM) uses an iterative approach to maximize the likelihood but makes some simplifying assumptions to avoid instabilities in the algorithm. However, the MLEM method is difficult to implement for experiment data.

Another method that is used is the multi-group method, which attempts to improve upon these previous methods by more optimally using the angular distribution information. The energy distribution of cosmic ray muons leads to an angular distribution that is a convolution of Gaussians. Low energy muons scatter more and lead to large angle tails on the angular distribution. Median metrics have been shown to generate more stable reconstructions. Neither POCA nor MLEM methods optimally use the angle information.

Momentum information that can be obtained from the residuals of the track fitting can also be used to reduce the variance introduced by low momentum trajectories. This is also difficult to use with large trackers because of a variety of effects that reduce the tracking resolution sufficiently to blur the momentum information.

The multi-group method fits the angular distribution of muons that pass through each voxel and whose trajectories intersect within a given convergence radius. The angular distributions are then fitted with sum of Gaussians with amplitudes, which are adjusted to fit a model of the incident muon momentum distribution as:

$$\frac{dN}{d\theta} = \sin(\theta) \sum \frac{A_i}{\theta_{0i}^2} e^{-\frac{\theta^2}{2\theta_{0i}^2}} \quad (3)$$

$$\theta_{0i} = \frac{14.1}{p_i}\sqrt{\frac{l}{X_0}} \quad (4)$$

where $A_i$ are amplitudes for each momentum bin, $p_i$, that are fitted to calibration objects and then fixed. The algorithm first collects the angular distributions for each voxel in a scene and then performs a one parameter fit on the number of scattering lengths ($l/X_0$) for each voxel that best describes the angular distribution. This algorithm optimally uses the angle information, and results in a considerable improvement in performance over median and mean methods.

However, because the muon flux is vertically directed with an angular distribution that varies as $\cos^2(\theta)$, where $\theta$ is the zenith angle, the position localization is good in the horizontal plane. The horizontal plane is illuminated uniformly at all angles in the horizontal plane, and not as well illuminated vertically, where the illumination is highly directional. This is illustrated in FIG. 1, which is a graph 100 illustrating a muon trajectory through a voxelated scene, according to an embodiment of the present invention.

Some embodiments pertain to a method for improving z localization. The method may use Fourier techniques to deconvolve the vertical blur function. In certain embodiments, muons that pass through voxel i, j, and k integrate contributions from all of the voxels through which the muons pass. This may be expressed as follows:

$$F_{ijk} = \Sigma \Omega(i'-i, j'-j, k'-k)\rho_{i'j'k'}. \quad (5)$$

where the sum extends over the entire scene. In this equation, $F_{ijk}$ is the reconstruction, $\rho_{i'j'k'}$ is the starting density distribution, and $\Omega(i'-i, j'-j, k'-k)$ is the probability that a muon will go through both voxel i, j, k and i', j', k'.

Performing a Fourier transform on Eq. (5) results in the following:

$$\tilde{F}_{i,j,k} = \tilde{\Omega}_{i,j,k}\tilde{\rho}_{i,j,k} \quad (6)$$

Here, the twiddles represent the transformed distributions. The density distribution is obtained by inverting the transform of:

$$\tilde{\rho}_{i,j,k} = \frac{\tilde{F}_{i,j,k}}{\tilde{\Omega}_{i,j,k}} \quad (7)$$

In order to test this method, $\Omega$ is approximated as follows:

$$\Omega(r, \theta) = \frac{\cos^2(\theta)\cos(x)\cos(y)d^2}{2\pi r^2} \quad (8)$$

$$\Omega(0) = 1 \quad (9)$$

where cos (x) and cos (y) are cosines of the projected angles, d is the voxel size, and r is the distance between voxel centers. In practice, this $\Omega$ will be obtained from the data.

Reconstruction

The algorithm described above has been applied to Decision Sciences data. See, for example, FIG. 2, which are images 200(a) and 200(b) showing a calibration scene, according to an embodiment of the present invention. These images 200(a) and 200(b) are compared in this example. The comparison shows that the deblurring algorithm produces better localization of a scanner structure and objects in the scene.

Figure 2:
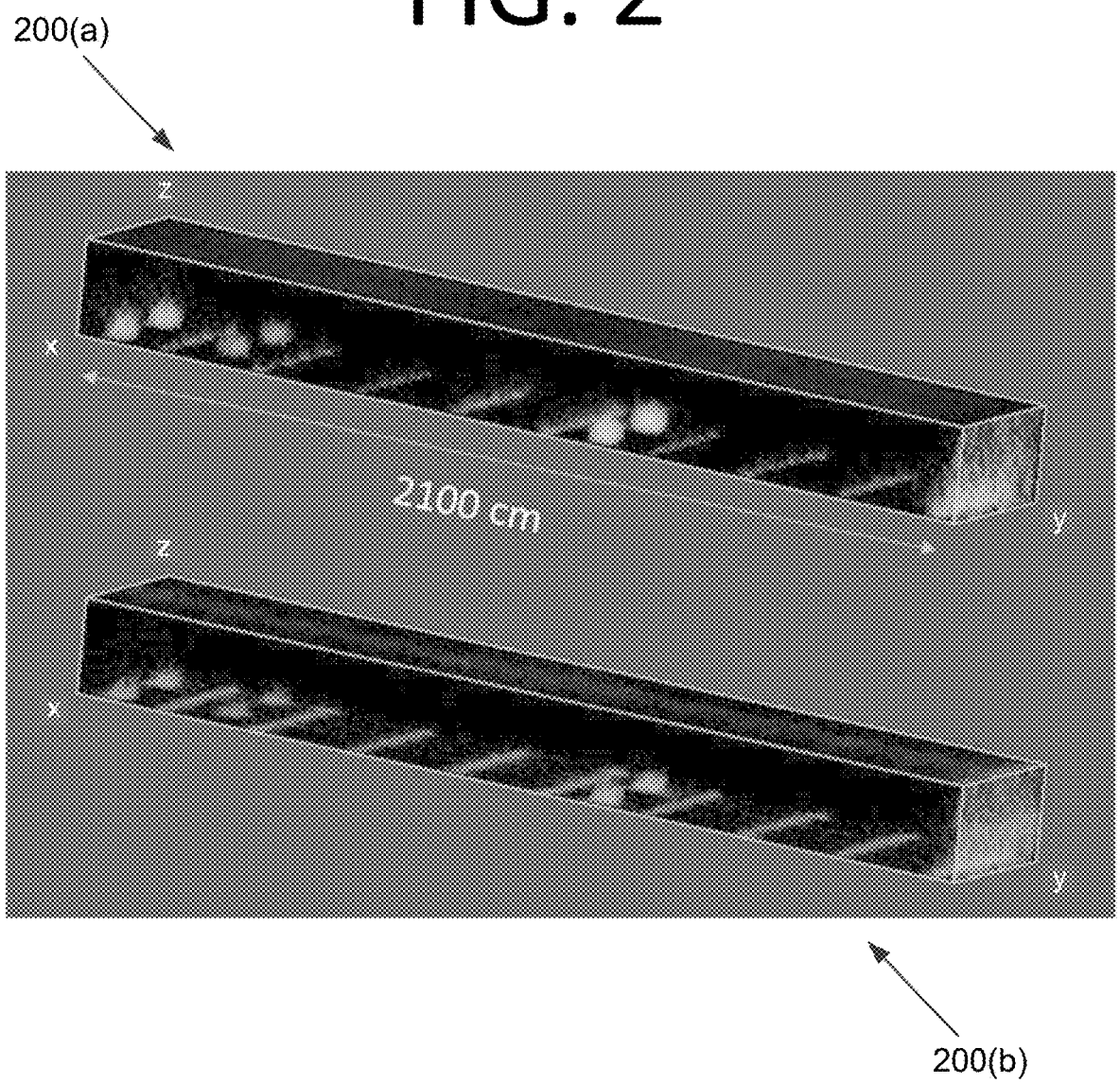
FIG. 2 is an image showing a starting image and a deblurred image, according to an embodiment of the present invention.
Figure 3A:
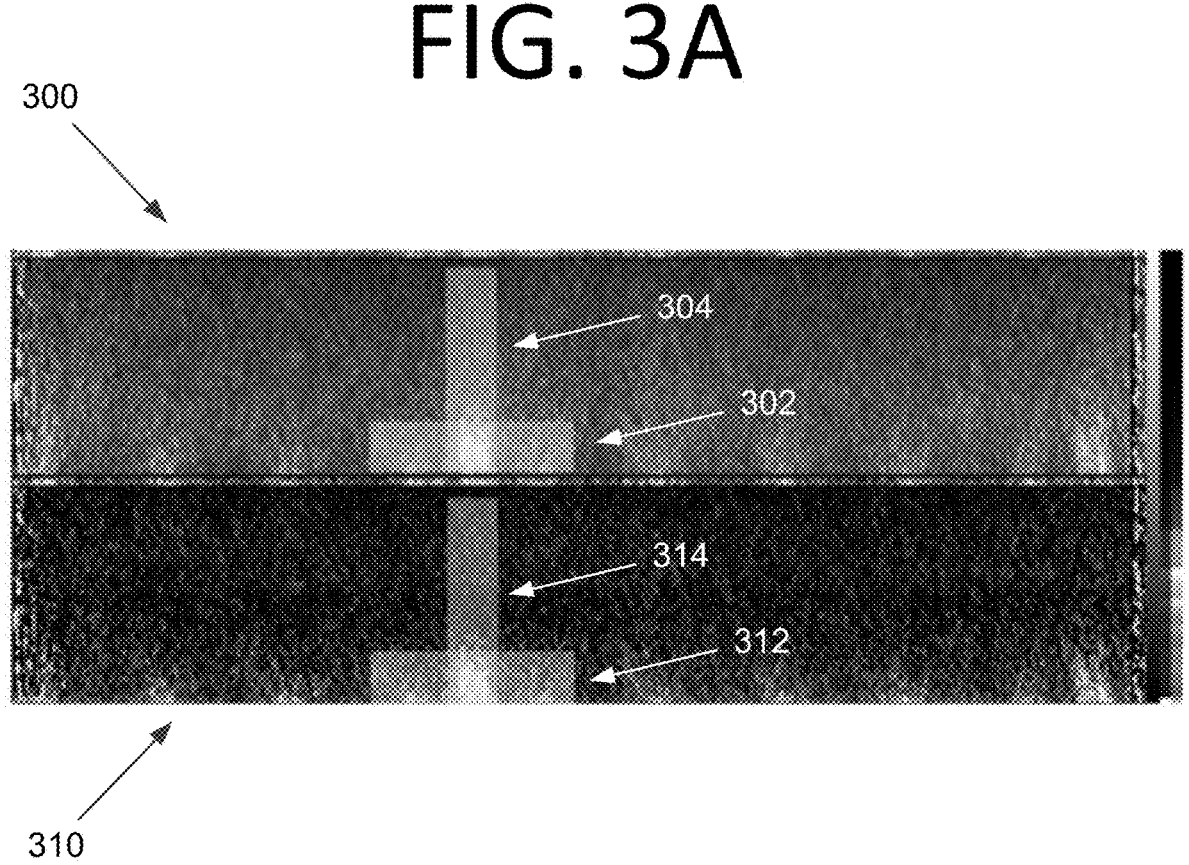
FIG. 3A is an image illustrating a vertical slice through a 10 minute exposure of the scene shown in FIG. 2, according to an embodiment of the present invention.

A slice and lineouts from the images 200(a) and 200(b) shown in FIG. 2 are shown in images 300, 310 of FIG. 3A. Specifically, image 300 is the starting image and image 310 is the deblurred image. The deblurring is again shown to reduce the vertical tail. A more precise estimate of the $\Omega$ function is likely to result in even better results.

Figure 3B:
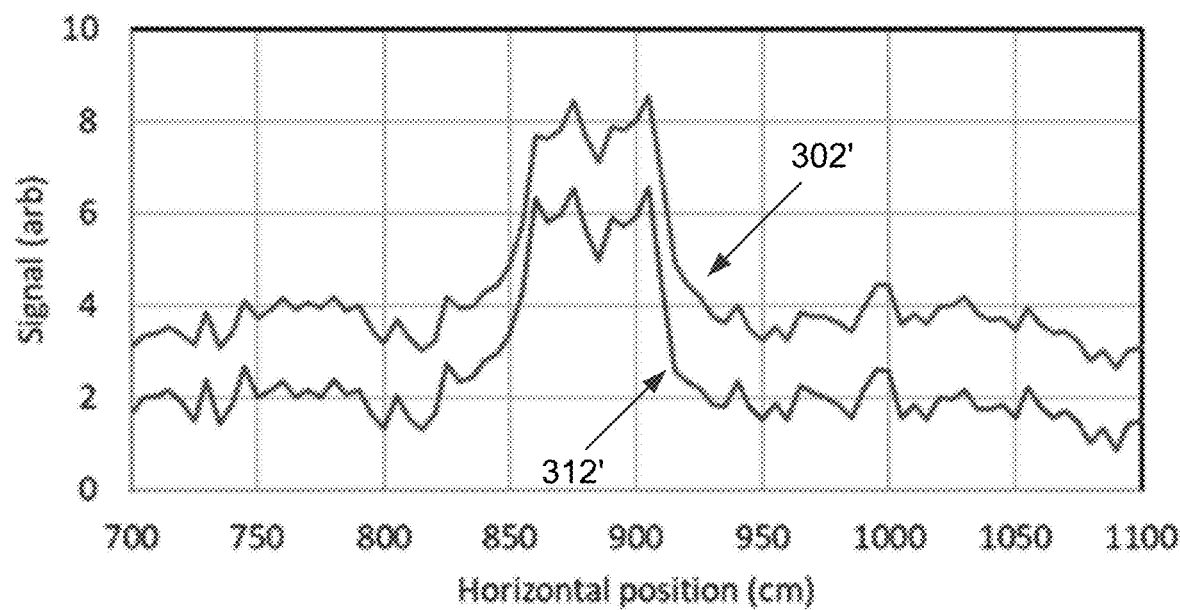
FIG. 3B is a graph illustrating horizontal lineouts shown in the shaded region of FIG. 3A, according to an embodiment of the present invention.
Figure 3C:
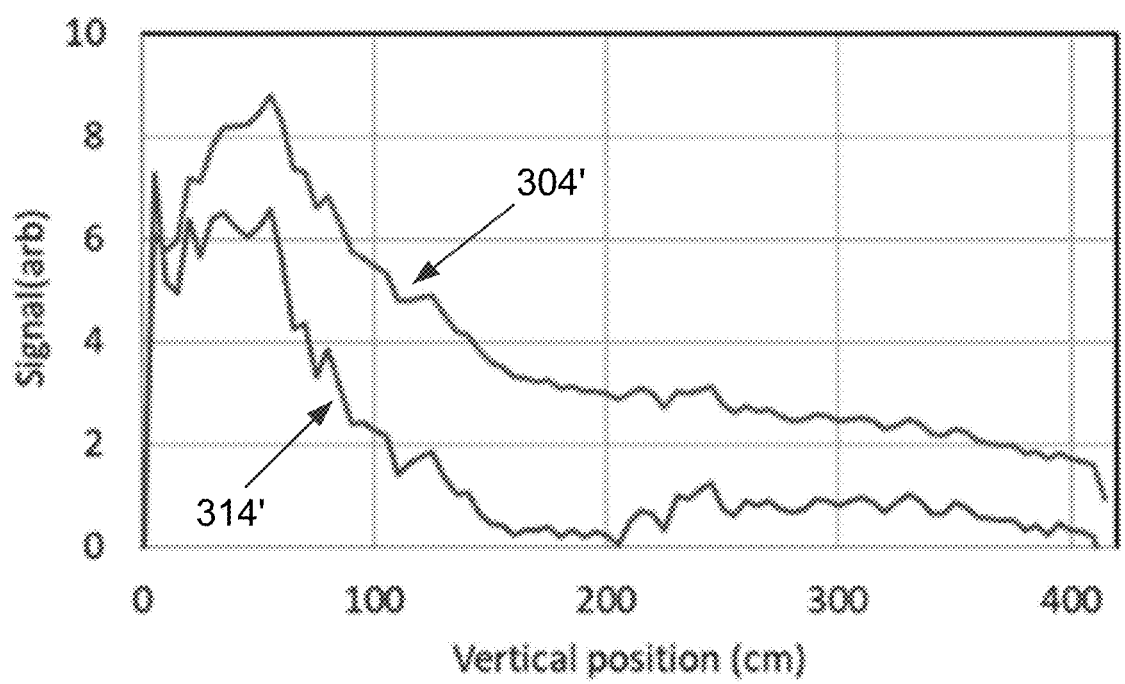
FIG. 3C is a graph illustrating vertical lineouts shown in the shaded region of FIG. 3A, according to an embodiment of the present invention.

Graph 320 of FIG. 3B and graph 330 of FIG. 3C show horizontal and vertical lineouts, respectively, in the shaded regions of FIG. 3A. Specifically, graph 320 shows horizontal lineouts 302', 312' that correspond to shaded regions 302, 312, respectively. Specifically, graph 330 shows vertical lineouts 304', 314' that correspond to shaded regions 304, 314, respectively.

FIG. 4 is a flowchart illustrating a process 400 for removing vertical blur from muon tomography images, according to an embodiment of the present invention. Process 400 begins with obtaining a 3D image of a scene at 410. In some embodiments, the obtaining of the 3D image includes reconstructing the 3D image of the scene between an upper detector and a lower detector by using measurements of scattering of cosmic ray muons passing through matter. In certain embodiments, the performing of the Fourier transform includes applying, for a voxel i, j, k, Eq. (6), where twiddles represent transformed distributions, $\tilde{F}_{i,j,k}$ is a reconstruction, $\tilde{\rho}_{i,j,k}$ is a density distribution, and $\tilde{\Omega}_{i,j,k}$ is a probability that a muon will pass through the voxel i, j, k. In certain embodiments, the density distribution $\tilde{\rho}_{i,j,k}$ is obtained by inverting a transform given in Eq. (7).

Using Fourier techniques, the vertical blur is removed from the obtained 3D image at 420. In some embodiments, vertical blur is removed by deconvolving the contributions of one or more (or all) voxels of the plurality of voxels in the image. This may involve using Fourier techniques and an optimized kernel that describes the contributions of one or more (or all) voxels around the voxel of interest. The deblurred image is then displayed to a user or provided for further analysis at 430.

Some embodiments pertain to an algorithm for removing vertical blur from muon tomography images generated using reconstruction methods, such as POCA, weighted POCA, or the multi-group method developed by Los Alamos National Laboratory. The method has been implemented using fast Fourier transforms using the infrastructure of a new display program. This algorithm is fast and effective at removing the vertical blur from the starting images, and proves useful in scenes complicated with clutter.

Figure 5:
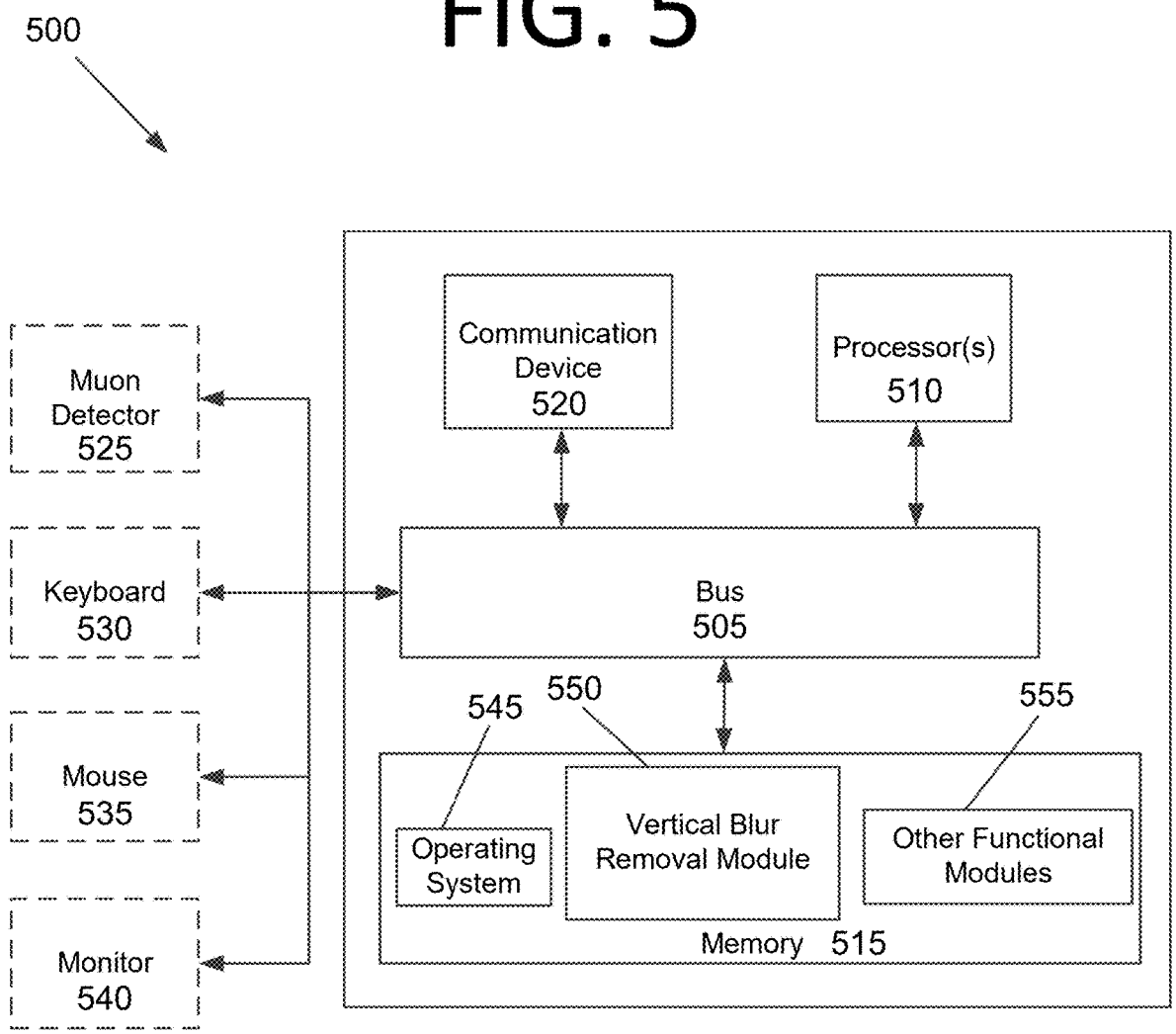
FIG. 5 is an architectural diagram illustrating a computing system configured to remove vertical blur from muon tomography images, according to an embodiment of the present invention.

FIG. 5 is an architectural diagram illustrating a computing system 500 configured to remove vertical blur from muon tomography images, according to an embodiment of the present invention. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both. Computing system 500 includes a communication device 520, such as a transceiver, to provide access to a communications network via a wireless and/or wired connection. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a muon detector 525, a keyboard 530, a mouse 535, and a monitor 540. In some embodiments, muon detector 525 includes an upper detector and a lower detector that take measurements of scattering of cosmic ray muons passing through matter. Memory 515 stores software modules that provide functionality when executed by processor(s) 510. The modules include an operating system 545 for computing system 500. The modules further include a vertical blur removal module 550 that is configured to remove vertical blur from a scene (e.g., a scene obtained based on data from muon detector 525). Computing system 500 may include one or more additional functional modules 555 that include additional functionality.

One skilled in the art will appreciate that a "computing system" could be embodied as an embedded computing system, a server, a desktop computer, a laptop computer, a mobile device, a quantum computing system, or any other suitable computing device or combination of computing devices without deviating from the scope of the invention. Presenting the above-described functions as being performed by a "computing system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 4 may be performed by a computer program, encoding instructions for the processor(s) to perform at least part of the process(es) described in FIG. 4, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 4, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A method for removing vertical blur from a muon tomography image, comprising:
   obtaining a three dimensional (3D) image of a scene, by a computing system, the 3D image comprising a plurality of voxels;
   removing vertical blur from the obtained 3D image to produce a deblurred image, by the computing system; and
   displaying the deblurred image or providing the deblurred image for further analysis, by the computing system, wherein
   the removing of the vertical blur from the obtained 3D image comprises improving z localization by performing a Fourier transform on the obtained 3D image that deconvolves a vertical blur function.

2. The method of claim 1, wherein the obtaining of the 3D image comprises reconstructing the 3D image of the scene between an upper detector and a lower detector by using measurements of scattering of cosmic ray muons passing through matter.

3. The method of claim 1, wherein the performing of the Fourier transform comprises applying, for a voxel i, j, k:

$$\tilde{F}_{i,j,k} = \tilde{\Omega}_{i,j,k} \tilde{\rho}_{i,j,k}$$

where twiddles represent transformed distributions, $\tilde{F}_{i,j,k}$ is a reconstruction, $\tilde{\rho}_{i,j,k}$ is a density distribution, and $\tilde{\Omega}_{i,j,k}$ is a probability that a muon will pass through the voxel i, j, k.

4. The method of claim 3, wherein the density distribution $\tilde{\rho}_{i,j,k}$ is obtained by inverting a transform of:

$$\tilde{\rho}_{i,j,k} = \frac{\tilde{F}_{i,j,k}}{\tilde{\Omega}_{i,j,k}}.$$

5. The method of claim 1, wherein the removing of the vertical blur comprises deconvolving contributions of one or more voxels of the plurality of voxels in the obtained 3D image.

6. The method of claim 5, wherein the deconvolving of the contributions of the one or more voxels comprises using the Fourier transform and an optimized kernel identifying contributions of the one or more voxels around a voxel of interest.

7. A computing system, comprising:
memory storing computer program instructions; and
at least one processor configured to execute the stored computer program instructions, wherein the computer program instructions are configured to cause the at least one processor to:
obtain a three dimensional (3D) image of a scene, the 3D image comprising a plurality of voxels,
remove vertical blur from the obtained 3D image to produce a deblurred image with improved z localization by performing a Fourier transform on the obtained 3D image that deconvolves a vertical blur function, and
display the deblurred image or provide the deblurred image for further analysis.

8. The computing system of claim 7, wherein the obtaining of the 3D image comprises reconstructing the 3D image of the scene between an upper detector and a lower detector by using measurements of scattering of cosmic ray muons passing through matter.

9. The computing system of claim 7, wherein the performing of the Fourier transform comprises applying, for a voxel i, j, k:

$$\tilde{F}_{i,j,k} = \tilde{\Omega}_{i,j,k} \tilde{\rho}_{i,j,k}$$

where twiddles represent transformed distributions, $\tilde{F}_{i,j,k}$ is a reconstruction, $\tilde{\rho}_{i,j,k}$ is a density distribution, and $\tilde{\Omega}_{i,j,k}$ is a probability that a muon will pass through the voxel i, j, k.

10. The computing system of claim 9, wherein the density distribution $\tilde{\rho}_{i,j,k}$ is obtained by inverting a transform of:

$$\tilde{\rho}_{i,j,k} = \frac{\tilde{F}_{i,j,k}}{\tilde{\Omega}_{i,j,k}}.$$

11. The computing system of claim 7, wherein the removing of the vertical blur comprises deconvolving contributions of one or more voxels of the plurality of voxels in the obtained three dimensional image.

12. The computing system of claim 11, wherein the deconvolving of the contributions of the one or more voxels comprises using the Fourier transform and an optimized kernel identifying contributions of the one or more voxels around a voxel of interest.

13. The computing system of claim 7, further comprising:
a muon detector configured to detect muons passing through matter and provide data pertaining to the detected muons to the at least one processor.

14. The computing system of claim 13, wherein the muon detector comprises an upper detector and a lower detector.

15. A non-transitory computer-readable medium storing a computer program, the computer program configured to cause at least one processor to:
obtain a three dimensional (3D) image of a scene, the 3D image comprising a plurality of voxels;
remove vertical blur from the obtained 3D image to produce a deblurred image with improved z localization by performing a Fourier transform on the obtained 3D image that deconvolves a vertical blur function; and
display the deblurred image or provide the deblurred image for further analysis.

16. The non-transitory computer-readable medium of claim 15, wherein the obtaining of the 3D image comprises reconstructing the 3D image of the scene between an upper detector and a lower detector by using measurements of scattering of cosmic ray muons passing through matter.

17. The non-transitory computer-readable medium of claim 15, wherein the performing of the Fourier transform comprises applying, for a voxel i, j, k:

$$\tilde{F}_{i,j,k} = \tilde{\Omega}_{i,j,k} \tilde{\rho}_{i,j,k}$$

where twiddles represent transformed distributions, $\tilde{F}_{i,j,k}$ is a reconstruction, $\tilde{\rho}_{i,j,k}$ is a density distribution, and $\tilde{\Omega}_{i,j,k}$ is a probability that a muon will pass through the voxel i, j, k.

18. The non-transitory computer-readable medium of claim 17, wherein the density distribution $\tilde{\rho}_{i,j,k}$ is obtained by inverting a transform of:

$$\tilde{\rho}_{i,j,k} = \frac{\tilde{F}_{i,j,k}}{\tilde{\Omega}_{i,j,k}}.$$

19. The non-transitory computer-readable medium of claim 15, wherein the removing of the vertical blur comprises deconvolving contributions of one or more voxels of the plurality of voxels in the obtained three dimensional image.

20. The non-transitory computer-readable medium of claim 19, wherein the deconvolving of the contributions of the one or more voxels comprises using the Fourier transform and an optimized kernel identifying contributions of the one or more voxels around a voxel of interest.

* * * * *